(12) United States Patent
Sakamoto et al.

(10) Patent No.: US 12,062,779 B2
(45) Date of Patent: Aug. 13, 2024

(54) NON-AQUEOUS ELECTROLYTE SECONDARY BATTERY

(71) Applicant: Panasonic Intellectual Property Management Co., Ltd., Osaka (JP)

(72) Inventors: Junichi Sakamoto, Osaka (JP); Yuji Tani, Osaka (JP); Nobuhiko Hojo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 501 days.

(21) Appl. No.: 17/441,527

(22) PCT Filed: Feb. 17, 2020

(86) PCT No.: PCT/JP2020/006115
§ 371 (c)(1),
(2) Date: Sep. 21, 2021

(87) PCT Pub. No.: WO2020/202843
PCT Pub. Date: Oct. 8, 2020

(65) Prior Publication Data
US 2022/0173381 A1    Jun. 2, 2022

(30) Foreign Application Priority Data

Mar. 29, 2019  (JP) .................. 2019-067638

(51) Int. Cl.
*H01M 4/36* (2006.01)
*H01M 4/38* (2006.01)
(Continued)

(52) U.S. Cl.
CPC .......... *H01M 4/364* (2013.01); *H01M 4/386* (2013.01); *H01M 4/587* (2013.01);
(Continued)

(58) Field of Classification Search
CPC ...... H01M 4/364; H01M 4/386; H01M 4/587; H01M 10/0525; H01M 2004/021;
(Continued)

(56) References Cited

U.S. PATENT DOCUMENTS 8,889,298 B2 * 11/2014 Zhamu .................. H01G 11/56
429/50
2013/0052489 A1 * 2/2013 Zhamu .................. B82Y 30/00
429/188
(Continued)

FOREIGN PATENT DOCUMENTS

CN      102820451 A  * 12/2012
CN      102820451 A    12/2012
(Continued)

OTHER PUBLICATIONS

International Search Report dated May 19, 2020, issued in counterpart International Application No. PCT/JP2020/006115. (2 pages).
English Translation of Chinese Search Report dated Oct. 26, 2023, issued in counterpart CN Patent Application No. 202080025846.4. (3 pages).

*Primary Examiner* — Abdullah A Riyami
*Assistant Examiner* — Nader J Alhawamdeh
(74) *Attorney, Agent, or Firm* — WHDA, LLP

(57) ABSTRACT

A non-aqueous electrolyte secondary battery with a negative electrode active material including a carbon material, and a silicon-containing material in which Si particles are dispersed in a lithium ion conductive phase. The negative electrode material mixture layer having a thickness $T_0$ includes a first region on the negative electrode surface side having a thickness of $T_1$, and a second region on the negative electrode current collector side, and the ratio $T_1/T_0$ is 1/20 to 19/20. The ratio of a mass ratio $M_{S1}$ of the silicon-containing material in the first region to a mass ratio $M_{S2}$ of the silicon-containing material in the second region is not less than 0 and less than 1. An open circuit potential of the (Continued)

negative electrode in a fully charged condition is higher than 0 mV and 70 mV or lower relative to lithium metal.

10 Claims, 2 Drawing Sheets

(51) Int. Cl.
 $H01M\ 4/587$ (2010.01)
 $H01M\ 10/0525$ (2010.01)
 $H01M\ 4/02$ (2006.01)
(52) U.S. Cl.
 CPC .. *H01M 10/0525* (2013.01); *H01M 2004/021* (2013.01); *H01M 2004/027* (2013.01)
(58) Field of Classification Search
 CPC ........... H01M 2004/027; H01M 4/133; H01M 4/134; H01M 4/366; H01M 4/62; H01M 4/625; Y02E 60/10
 See application file for complete search history.

(56) References Cited

U.S. PATENT DOCUMENTS

| | | | | |
|---|---|---|---|---|
| 2015/0318542 | A1* | 11/2015 | Morozumi | H01M 4/364 427/122 |
| 2017/0309950 | A1* | 10/2017 | Minami | H01M 4/405 |
| 2018/0248222 | A1* | 8/2018 | Iwama | H01M 4/134 |
| 2019/0123353 | A1* | 4/2019 | Hirose | H01M 4/36 |

FOREIGN PATENT DOCUMENTS

| | | |
|---|---|---|
| CN | 104347842 A | 2/2015 |
| CN | 107408682 A | 11/2017 |
| JP | 2008-152996 A | 7/2008 |
| JP | 2010-165471 A | 7/2010 |
| JP | 2010-238426 A | 10/2010 |
| JP | 2013-178913 A | 9/2013 |
| JP | 2018-181539 A | 11/2018 |
| WO | 2018/179817 A | 10/2018 |

* cited by examiner

NON-AQUEOUS ELECTROLYTE SECONDARY BATTERY

TECHNICAL FIELD

The present invention relates to a non-aqueous electrolyte secondary battery including a silicon-containing material.

BACKGROUND ART

Non-aqueous electrolyte secondary batteries, particularly lithium ion secondary batteries, because of their high voltage and high energy density, have been expected as promising power sources for small consumer applications, power storage devices, and electric cars. With increasing demand for a higher battery energy density, a material containing silicon (Si) that forms an alloy with lithium has been expected to be utilized as a negative electrode active material having a high theoretical capacity density.

Patent Literature 1 discloses, relating to a secondary battery, in a fully charged condition, allowing lithium metal to deposit on a surface of a negative electrode containing graphite as a negative electrode active material. Lithium ions absorbed in the negative electrode active material and the lithium metal deposited on the surface of the negative electrode are utilized for discharge reaction.

CITATION LIST

Patent Literature

[PTL 1] Japanese Laid-Open Patent Publication No. 2008-152996

SUMMARY OF INVENTION

Technical Problem

In order to achieve a higher capacity, one possible way is to use a silicon-containing material as the negative electrode active material in the secondary battery disclosed in Patent Literature 1. However, due to the side reaction between the silicon-containing material and the lithium metal deposited on the surface of the negative electrode, the silicon-containing material tends to deteriorate, and the cycle characteristics may be lowered.

Solution to Problem

In view of the above, one aspect of the present invention relates to a non-aqueous electrolyte secondary battery, including: a positive electrode; a negative electrode; and an electrolyte, the negative electrode including a negative electrode material mixture layer containing a negative electrode active material, and a negative electrode current collector supporting the negative electrode material mixture layer, wherein the negative electrode active material includes a carbon material and a silicon-containing material, the silicon-containing material includes a lithium ion conductive phase, and silicon particles dispersed in the lithium ion conductive phase, the lithium ion conductive phase is a silicate phase and/or a carbon phase, the silicate phase contains at least one selected from the group consisting of alkali metal elements and Group 2 elements, the negative electrode material mixture layer has a thickness $T_0$, and includes a first region on the negative electrode surface side having a thickness of $T_1$, and a second region other than the first region on the negative electrode current collector side, a ratio: $T_1/T_0$ of the thickness $T_1$ of the first region to the thickness $T_0$ of the negative electrode material mixture layer is not less than 1/20 and not greater than 19/20, a ratio: $M_{S1}/M_{S2}$ of a mass ratio $M_{S1}$ of the silicon-containing material in the first region to a mass ratio $M_{S2}$ of the silicon-containing material in the second region is not less than 0 and less than 1, and an open circuit potential of the negative electrode in a fully charged condition is higher than 0 mV and 70 mV or lower relative to lithium metal.

Advantageous Effects of Invention

According to the present invention, the cycle characteristics of a non-aqueous electrolyte secondary battery including a silicon-containing material can be improved.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENT

Figure 1:
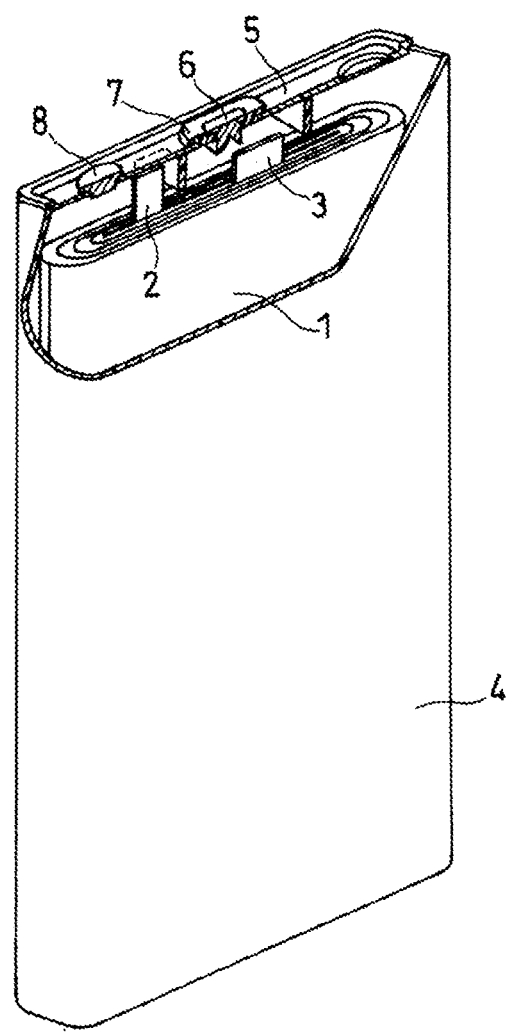
FIG. 1 A partially cut-away schematic oblique view of a non-aqueous electrolyte secondary battery according to one embodiment of the present invention.

A non-aqueous electrolyte secondary battery according to an embodiment of the present invention includes a positive electrode, a negative electrode, and an electrolyte, and the negative electrode includes a negative electrode material mixture layer, and a negative electrode current collector supporting the negative electrode material mixture layer. The negative electrode material mixture layer includes a negative electrode active material capable of electrochemically absorbing and releasing lithium ions. The negative electrode active material includes a carbon material and a silicon-containing material. The silicon-containing material includes a lithium ion conductive phase, and silicon particles dispersed in the lithium ion conductive phase, and the lithium ion conductive phase is a silicate phase and/or a carbon phase, and the silicate phase contains at least one selected from the group consisting of alkali metal elements and Group 2 elements. By using a silicon-containing material and a carbon material in combination, high capacity and excellent cycle characteristics can be easily obtained in a balanced manner.

The negative electrode material mixture layer has a thickness $T_0$. The thickness $T_0$ of the negative electrode material mixture layer can be obtained by, for example, measuring a thickness of the negative electrode material mixture layer at 10 random points and averaging the measured values. When the negative electrode material mixture layer is supported on both sides of the negative electrode current collector, the thickness $T_0$ refers to a thickness of the negative electrode material mixture layer per one surface.

The negative electrode is designed to have an open circuit potential of higher than 0 mV and 70 mV or lower relative to lithium metal, in a fully charged condition. That is, the negative electrode is designed such that lithium metal deposits on a surface of the negative electrode material mixture layer, in a fully charged condition. Lithium ions absorbed in the negative electrode active material and the lithium metal deposited on the surface of the negative electrode material mixture layer are utilized for discharge reaction, increasing the discharge capacity. The open circuit potential in a fully charged condition may be set to 40 mV or higher and 60 mV or lower relative to lithium metal. The lower the open circuit potential in a fully charged condition is, the higher the utilization rate of the negative electrode is, and the deeper the depth of charge of Si is.

"A fully charged condition" refers to a state where, when the rated capacity of the battery is denoted by C, the battery is charged until a state of charge (SOC) of, for example, 0.98 C or more is reached. The open circuit potential of a negative electrode in a fully charged condition may be measured by dismantling the battery in a fully charged condition under an argon atmosphere to take out the negative electrode, and assembling it into a cell for measurement, using lithium metal as a counter electrode. The electrolyte of the cell may be of the same composition as the electrolyte in the battery dismantled, and may be, for example, an electrolyte used in a battery A1 of Example 1 described hereinafter.

The negative electrode material mixture layer has a first region on the negative electrode surface side having a thickness $T_1$, and a second region other than the first region on the negative electrode current collector side. The ratio: $T_1/T_0$ of the thickness $T_1$ of the first region to the thickness $T_0$ of the negative electrode material mixture layer is not less than 1/20 and not greater than 19/20. The ratio: $M_{S1}/M_{S2}$ of a mass ratio $M_{S1}$ of the silicon-containing material in the first region to a mass ratio $M_{S2}$ of the silicon-containing material in the second region is not less than 0 and less than 1.

When the $M_{S1}/M_{S2}$ is less than 1, the presence ratio of the silicon-containing material is small on the negative electrode surface side in the negative electrode material mixture layer. In this case, the side reaction between the silicon-containing material and the lithium metal deposited on the surface of the negative electrode is suppressed, and the deterioration of the silicon-containing material due to the side reaction is suppressed, leading to improved cycle characteristics.

The $M_{S1}/M_{S2}$ is preferably not less than 0 and not greater than 1/3, more preferably not less than 0 and not greater than 1/6, further more preferably not less than 0 and not greater than 1/9. In particular, $M_{S1}/M_{S2}=0$, that is, $M_{S1}=0$ (i.e., the first region does not contain the silicon-containing material) is preferable.

When the $T_1/T_0$ is not less than 1/20, the first region in which the content of the silicon-containing material is small is sufficiently secured, the aforementioned deterioration of the silicon-containing material due to the side reaction is suppressed, which can lead to improved cycle characteristics. When the $T_1/T_0$ is not greater than 19/20, the second region in which the content of the silicon-containing material is large is sufficiently secured, which can lead to a higher capacity due to the use of the silicon-containing material. The $T_1/T_0$ is preferably not less than 1/20 and not greater than 6/20.

When the negative electrode material mixture layer is divided into two, i.e., a region P1 having a thickness of $T_0/2$ on the negative electrode surface side and a region P2 having a thickness of $T_0/2$ on the negative electrode current collector side, the ratio: $M_{P1}/M_{P2}$ of a mass ratio MN of the silicon-containing material in the region P1 to a mass ratio $M_{P2}$ of the silicon-containing material in the region P2 is not less than 0 and less than 1, and may be, for example, not less than 0 and not greater than 0.8, or not less than 0 and not greater than 0.6.

When the silicon-containing material is an LSX material as described hereinafter, the $M_{P1}/M_{P2}$ can be determined, for example, as follows.

A battery is dismantled, to take out the negative electrode, which is then washed with a non-aqueous solvent, such as ethylene carbonate, and dried. The region P1 of the negative electrode material mixture layer is scraped off, to use it as a first sample, and then, the remaining region P2 is scraped off, to use it as a second sample, using a diagonal cutting machine (product name: SAICAS, available from Daipla Wintes Co., Ltd.) or the like. The first sample is fully dissolved in a heated acid solution (a mixed acid of hydrofluoric acid, nitric acid and sulfuric acid), and the residue of dissolution, carbon, is removed by filtration. The obtained filtrate is analyzed by inductively coupled plasma emission spectroscopy (ICP-AES), to measure a spectral intensity of Si element. Subsequently, using a commercially available standard solution of Si element, a calibration curve is drawn, from which a content $S_{P1}$ of the Si element in the first sample is determined. Similarly, a content $S_{P2}$ of the Si element in the second sample is determined. $S_{P1}/S_{P2}$ is determined as the $M_{P1}/M_{P2}$.

The mass ratio $M_{c1}$ of the carbon material in the first region is preferably greater than the mass ratio $M_{c2}$ of the carbon material in the second region. That is, the ratio of the $M_{C1}$ to the $M_{C2}:M_{C1}/M_{C2}$ is preferably greater than 1, more preferably not less than 1.05. By increasing the amount of the carbon material in the first region, the amount of the silicon-containing material in the first region can be reduced, and the influence on the negative electrode capacity caused by reducing the amount of the silicon-containing material in the first region can be reduced. When a negative electrode auxiliary material as described hereinafter is used, the amount of the negative electrode auxiliary material in the first region can be reduced. When the lithium ion conductive phase of the silicon-containing material is a carbon phase, the carbon phase serving as the lithium ion conductive phase is not included in the mass of the carbon material.

In view of suppressing the deterioration of the silicon-containing material due to the aforementioned side reaction, the mass ratio of the silicon-containing material to the carbon material in the first region is preferably not less than 0/100 and less than 1/99. In the first region, the mass ratio of the silicon-containing material to the carbon material is more preferably 0/100. That is, it is more preferable that the first region contains a carbon material as the negative electrode active material and does not contain the silicon-containing material.

In the second region, the mass ratio of the silicon-containing material to the carbon material is preferably not less than 1/99 and not greater than 10/90. When the mass ratio of the silicon-containing material to the carbon material is not less than 1/99, a higher capacity tends to be achieved. When the mass ratio of the silicon-containing material to the carbon material is not greater than 10/90, the cycle characteristics tend to be improved.

The negative electrode material mixture layer may further contain a negative electrode auxiliary material. The negative electrode auxiliary material as used herein means an auxiliary material other than an electrically conductive agent, and includes a binder and/or a thickener. When the negative electrode material mixture layer contains a negative electrode auxiliary material, the mass ratio $M_{A1}$ of the negative electrode auxiliary material in the first region is preferably smaller than the mass ratio $M_{A2}$ of the negative electrode auxiliary material in the second region. Due to the side reaction between the negative electrode auxiliary material and the Li metal deposited on the surface of the negative electrode, the negative electrode auxiliary material may deteriorate. Also, a polymer compound, such as PVDF, as described below used as the negative electrode auxiliary material may deteriorate due to the presence of Li metal that has a strong reducing power. By reducing the presence ratio of the negative electrode auxiliary material in a certain region on the negative electrode surface side, the aforementioned side reaction can be suppressed, and the deterioration of the negative electrode auxiliary material due to the side reaction can be suppressed, leading to improved cycle characteristics. The ratio of $M_{A1}$ to $M_{A2}$: $M_{A1}/M_{A2}$ may be not less than 1/3 and less than 1, and may be not less than 1/3 and not greater than 2/3.

The binder may be a resin material, examples of which include: fluorocarbon resin, such as polytetrafluoroethylene and polyvinylidene fluoride (PVDF); polyolefin resin, such as polyethylene and polypropylene; polyamide resin, such as aramid resin; polyimide resin, such as polyimide and polyamide-imide; acrylic resin, such as polyacrylic acid, methyl polyacrylate, and ethylene-acrylic acid copolymer; vinyl resin, such as polyacrylonitrile and polyvinyl acetate; polyvinyl pyrrolidone; polyether sulfone; and a rubbery material, such as styrene-butadiene copolymer rubber (SBR). These may be used singly or in combination of two or more kinds.

Examples of the thickener include: cellulose derivatives (e.g., cellulose ethers), such as carboxymethyl cellulose (CMC) and modified products thereof (including salts such as Na salts), and methyl cellulose; saponificated products of polymers having vinyl acetate units, such as polyvinyl alcohol; and polyethers (e.g., polyalkylene oxide, such as polyethylene oxide). These may be used singly or in combination of two or more kinds.

The mass ratio $M_{A1}$ of the negative electrode auxiliary material in the first region is, for example, 0.8 mass % or more and 1.6 mass % or less, preferably 1.0 mass % or more and 1.4 mass % or less. When the mass ratio $M_{A1}$ of the negative electrode auxiliary material in the first region is 1.4 mass % or less, the deterioration of the negative electrode auxiliary material due to the side reaction between the negative electrode auxiliary material and the lithium metal deposited on the negative electrode surface can be sufficiently suppressed. When the mass ratio $M_{A1}$ of the negative electrode auxiliary material in the first region is 1.0 mass % or more, the addition of the negative electrode auxiliary material can be sufficiently effective. For example, the contact resistance between negative electrode active material particles can be reduced. Also, the adhesion between the negative electrode active material particles can be ensured. The mass ratio $M_{A1}$ of the negative electrode auxiliary material in the first region refers to a mass ratio of a total of the binder and the thickener in the first region.

The mass ratio $M_{A2}$ of the negative electrode auxiliary material in the second region is, for example, 2.4 mass % or more and 3.2 mass % or less, preferably 2.6 mass % or more and 3.0 mass % or less. When the mass ratio $M_{A2}$ of the negative electrode auxiliary material in the second region is 2.6 mass % or more, the adhesion between the negative electrode current collector and the negative electrode material mixture layer can be sufficiently ensured. Furthermore, the contact resistance between the negative electrode current collector and the negative electrode material mixture layer can be sufficiently reduced. When the mass ratio $M_{A2}$ of the negative electrode auxiliary material in the second region is 3.0 mass % or less, the packed amount of the active material can be sufficiently ensured. The mass ratio $M_{A2}$ of the negative electrode auxiliary material in the second region refers to a mass ratio of a total of the binder and the thickener in the second region.

A ratio: $C_n/C_p$ of the capacity $C_n$ of the negative electrode to the capacity $C_p$ of the positive electrode is not limited as long as it is greater than 0, but may be less than 1. By setting the capacity ratio $C_n/C_p$ to be less than 1, the utilization rate of the negative electrode can be remarkably increased, which is advantageous for a higher capacity. The capacity ratio $C_n/C_p$ may be, for example, not less than 0.5 and less than 1, and may be not less than 0.6 and not greater than 0.9. The open circuit potential of the negative electrode in a fully charged condition varies depending on the capacity ratio $C_n/C_p$.

Here, the capacity $C_n$ of the negative electrode and the capacity $C_p$ of the positive electrode both refer to a design capacity. For example, the design capacity of each electrode can be calculated from the theoretical capacity and the mass of the active material contained in each electrode. The theoretical capacity (also called the capacity density) is the maximum quantity of electricity that a unit mass of the active material can store in an assumed electrochemical reaction.

A detailed description will be given below of the negative electrode active material.

(Silicon-Containing Material)

The silicon-containing material is a composite material including a lithium ion conductive phase and silicon particles dispersed in the lithium ion conductive phase. The lithium ion conductive phase contains a silicate phase and/or a carbon phase. The silicate phase contains at least one selected from the group consisting of alkali metal elements and Group 2 elements. In other words, the silicon-containing material includes at least one of a composite material including a silicate phase and silicon particles dispersed in the silicate phase (hereinafter sometimes referred to as an LSX material), and a composite material including a carbon phase and silicon particles dispersed in the carbon phase (hereinafter sometimes referred to as an Si—C material). In this case, it is easy to adjust the amount and the size of the silicon particles dispersed in the lithium ion conductive phase, which is advantageous for a higher capacity. Also, the lithium ion conductive phase can reduce the stress that occurs in association with expansion and contraction of silicon particles during charge and discharge, which is advantageous for the improvement in cycle characteristics.

The LSX material can be prepared by, for example, pulverizing a mixture of a silicate and a raw material silicon, into fine particles, using a pulverizer, such as a ball mill, followed by a heat treatment in an inert atmosphere. Without using a pulverizer, a mixture of fine particles of silicate and fine particles of a raw material silicon, which are synthesized separately, may be subjected to a heat treatment in an inert atmosphere, so that a LSX material is prepared. In the above, by adjusting the blending ratio between the silicate and the raw material silicon, or the particle size of the raw material silicon, the amount or the size of the silicon particles dispersed in the silicate phase can be controlled.

In view of suppressing cracks in the silicon particles themselves, the average particle diameter of the silicon particles is preferably 500 nm or less before the initial charging, more preferably 200 nm or less, and further more preferably 100 nm or less. After the initial charging, the average particle diameter of the silicon particles is preferably 400 nm or less, more preferably 100 nm or less. The silicon particles, which are refined in size, show less changes in volume during charge and discharge, leading to further improved structural stability of the silicon-containing material.

The average particle diameter of the silicon particles can be measured by observing a cross-sectional SEM (scanning electron microscope) photograph of the silicon-containing material. Specifically, the average particle diameter of the silicon particles can be obtained by averaging the maximum diameters of 100 random silicon particles.

The silicon particles dispersed in the lithium silicate phase are each composed of single crystallite or multiple crystallites. The silicon particles preferably has a crystallite size of 30 nm or less. When the crystallite size of the silicon particles is 30 nm or less, the changes in volume of the silicon particles associated with expansion and contraction during charge and discharge can be reduced, and the cycle characteristics can be further improved. For example, in association with the contraction of the silicon particles, voids are formed around a silicon particle, decreasing the contact points on the particle with the surrounding material to decrease, and causing the particle to be isolated. However, such isolation of the particle can be suppressed, and the reduction in the charge-discharge efficiency due to the isolation of the particle can be suppressed. The lower limit of the crystallite size of the silicon particles is not specifically limited, but is, for example, 5 nm.

The crystallite size of the silicon particles is more preferably 10 nm or more and 30 nm or less, more preferably 15 nm or more and 25 nm or less. When the crystallite size of the silicon particles is 10 nm or more, the surface area of the silicon particles can be suppressed small, and the deterioration of the silicon particles accompanying the generation of irreversible capacity is unlikely to occur.

The crystallite size of the silicon particles can be calculated from the Scherrer formula, using a half-width of a diffraction peak attributed to the Si (111) plane of an X-ray diffractometry (XRD) pattern of the silicon particle.

In view of achieving a higher capacity, the content of the silicon particles in the silicon-containing material is preferably 30 mass % or more, more preferably 35 mass % or more, further more preferably 55 mass % or more. In this case, the lithium ions can diffuse favorably, making it easy to obtain excellent load characteristics. On the other hand, in view of improving the cycle characteristics, the content of the silicon particles in the silicon-containing material is preferably 95 mass % or less, more preferably 75 mass % or less, further more preferably 70 mass % or less. In this case, the exposed surface area of the silicon particles without being covered with the silicate phase decreases, and the reaction between the electrolyte and the silicon particles tends to be suppressed.

The content of the silicon particles can be measured by Si-NMR. Desirable Si-NMR measurement conditions are shown below.

Measuring apparatus: Solid nuclear magnetic resonance spectrometer (INOVA-400), available from Varian, Inc.
Probe: Varian 7 mm CPMAS-2
MAS: 4.2 kHz
MAS speed: 4 kHz
Pulse: DD (45° pulse+signal capture time 1H decoupling)
Repetition time: 1200 sec
Observation width: 100 kHz
Observation center: around—100 ppm
Signal capture time: 0.05 sec
Number of times of accumulation: 560
Sample amount: 207.6 mg The silicate phase contains at least one of alkali metal elements (Group 1 elements except hydrogen in the long-form periodic table) and Group 2 elements in the long-form periodic table. The alkali metal element includes, for example, lithium (Li), potassium (K), and sodium (Na). The Group 2 element includes, for example, magnesium (Mg), calcium (Ca), strontium (Sr), and barium (Ba). The silicate phase may contain one or more elements other than the alkali metal element and the Group 2 element, such as aluminum (Al), boron (B), lanthanum (La), phosphorus (P), zirconium (Zr), titanium (Ti), iron (Fe), chromium (Cr), nickel (Ni), manganese (Mn), copper (Cu), molybdenum (Mo), and zinc (Zn). Particularly preferred is a silicate phase containing lithium (hereinafter sometimes referred to as a lithium silicate phase), in terms of its small irreversible capacity and a high initial charge-discharge efficiency. In other words, the silicon-containing material is preferably a composite material including a lithium silicate phase and silicon particles dispersed in the lithium silicate phase.

The silicate phase is, for example, a lithium silicate phase (oxide phase) containing lithium (Li), silicon (Si), and oxygen (O). The atomic ratio: O/Si of O to Si in the lithium silicate phase is, for example, greater than 2 and less than 4. When the O/Si is greater than 2 and less than 4 (z in the formula below satisfies $0<z<2$), it becomes advantageous in terms of the stability and the lithium ion conductivity. The O/Si is preferably greater than 2 and less than 3 (z in the formula below satisfies $0<z<1$). The atomic ratio: Li/Si of Li to Si in the lithium silicate phase is, for example, greater than 0 and less than 4. The lithium silicate phase may contain, in addition to Li, Si, and O, a trace of the aforementioned other elements.

The lithium silicate phase can have a composition represented by a formula: $Li_{2z}SiO_{2+z}$, where $0<z<2$. In view of the stability, the ease of production, and the lithium ion conductivity, z preferably satisfies $0<z<1$, and more preferably $z=½$.

The composition of the silicate phase of the LSX material can be analyzed, for example, as follows.

First, the battery is dismantled, to take out the negative electrode, which is then washed with a non-aqueous solvent, such as ethylene carbonate, and dried. This is followed by polishing with a cross section polisher (CP) to reveal a cross section of the negative electrode material mixture layer, thereby to obtain a sample. A field emission scanning electron microscope (FE-SEM) is used to give a reflected electron image of a sample cross section, to observe the cross section of the LSX material. Then, an Auger electron spectroscopy (AES) analyzer is used to perform a qualitative/quantitative analysis of elements in the silicate phase of the observed LSX material (acceleration voltage: 10 kV, beam current: 10 nA). For example, in the case of a lithium silicate phase represented by $Li_{2z}SiO_{2+z}$, the ratio of 2z and (2+z) can be determined from the obtained contents of lithium (Li) and oxygen (O).

In the cross-section observation and analysis of the sample, in order to prevent the diffusion of Li, a carbon specimen support can be used for fixing the sample. In order to prevent the quality alteration of the sample cross section, a transfer vessel that holds and conveys a sample without exposing the sample to air can be used.

The carbon phase may be composed of, for example, an amorphous carbon having low crystallinity. The amorphous carbon may be, for example, hard carbon, soft carbon, and others. The amorphous carbon can be obtained by, for example, sintering a carbon source in an inert atmosphere and pulverizing the obtained sintered body. The Si—C material can be obtained by, for example, mixing a carbon source and a raw material silicon, and crushing and stirring the mixture in a stirrer, such as a ball mill, and then baking the mixture in an inert atmosphere. Examples of the carbon source include: sugars and water-soluble resin, such as carboxymethyl cellulose (CMC), polyvinyl pyrrolidone, cellulose, and sucrose. When mixing a carbon source and a raw material silicon, for example, the carbon source and the raw material silicon may be dispersed in a dispersion medium, such as an alcohol. In the above, by adjusting the blending ratio between the carbon source and the raw material silicon, or the particle size of the raw material silicon, the amount or the size of the silicon particles dispersed in the carbon phase can be controlled, which makes it easy to achieve a higher capacity.

The silicon-containing material preferably forms a particulate material (hereinafter sometimes referred to as composite material particles) having an average particle diameter of 1 to 25 μm, or 4 to 15 μm. When the particle diameter is in the range above, the stress that occurs in association with changes in volume of the composite material during charge and discharge tends to be reduced, and the favorable cycle characteristics tend to be obtained. Furthermore, the surface area of the composite material particles tend to be appropriate, and the reduction in capacity due to the side reaction with the electrolyte can be suppressed.

The average particle diameter of the composite material particles means a particle diameter at 50% cumulative volume (volume average particle diameter) in a volumetric particle diameter distribution measured by a laser diffraction and scattering method. As the measuring instrument, for example, "LA-750", available from Horiba, Ltd. (HORIBA) can be used.

The composite material particles may have an electrically conductive material covering at least part of the particle surface. By covering the surface of the composite material particles with the conductive material, the conductivity can be improved. The conductive layer is preferably thin enough not to substantially influence the average particle diameter of the composite material particles.

(Carbon Material)

The carbon material undergoes a smaller degree of expansion and contraction during charge and discharge than the silicon-containing material. By using the silicon-containing material in combination with the carbon material, during repetitive charge and discharge, the contacting state between the negative electrode active material particles and between the negative electrode material mixture layer and the negative electrode current collector can be maintained more favorably. That is, the cycle characteristics can be enhanced while imparting the high capacity of the silicon-containing material to the negative electrode.

Examples of the carbon material used for the negative electrode active material include graphite, graphitizable carbon (soft carbon), and non-graphitizable carbon (hard carbon). Preferred among them is graphite, which is stable during charge and discharge and whose irreversible capacity is small. The graphite means a material having a graphite-like crystal structure, examples of which include natural graphite, artificial graphite, and graphitized mesophase carbon particles. These carbon materials may be used singly or in combination of two or more kinds.

Next, a detailed description will be given below of a non-aqueous electrolyte secondary battery according to an embodiment of the present invention. The non-aqueous electrolyte secondary battery includes, for example, a negative electrode, a positive electrode, and an electrolyte, as below.

[Negative Electrode]

The negative electrode includes, for example, a negative electrode material mixture layer containing a negative electrode active material capable of electrochemically absorbing and releasing lithium ions, and a negative electrode current collector supporting the negative electrode material mixture layer. The negative electrode active material includes a silicon material and a carbon material. The negative electrode material mixture layer may contain the aforementioned negative electrode auxiliary material. The negative electrode material mixture layer can be formed by, for example, applying a negative electrode slurry in which a negative electrode material mixture containing a negative electrode active material is dispersed in a dispersion medium, onto a surface of the negative electrode current collector, followed by drying. The dry applied film may be rolled, if necessary. The negative electrode material mixture layer may be formed on one surface or both surfaces of the negative electrode current collector.

The negative electrode material mixture may further include an electrically conductive agent. Examples of the conductive agent include: carbons, such as acetylene black and carbon nanotubes; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. These may be used singly or in combination of two or more kinds.

Examples of the negative electrode current collector include a non-porous electrically conductive substrate (e.g., metal foil) and a porous electrically conductive substrate (e.g., mesh, net, punched sheet). The negative electrode current collector may be made of, for example, stainless steel, nickel, a nickel alloy, copper, or a copper alloy. The thickness of the negative electrode current collector is not limited, but is, for example, 1 to 50 μm, and may be 5 to 20 μm.

The dispersion medium is not limited. Examples thereof include water, alcohols such as ethanol, ethers such as tetrahydrofuran, amides such as dimethylformamide, N-methyl-2-pyrrolidone (NMP), and a mixed solvent of these.

[Positive Electrode]

The positive electrode includes, for example, a positive electrode material mixture layer containing a positive electrode active material capable of electrochemically absorbing and releasing lithium ions, and a positive electrode current collector supporting the positive electrode material mixture layer. The positive electrode material mixture layer can be formed by, for example, applying a positive electrode slurry in which a positive electrode material mixture is dispersed in a dispersion medium, such as NMP, onto a surface of the positive electrode current collector, followed by drying. The dry applied film may be rolled, if necessary. The positive electrode material mixture layer may be formed on one surface or both surfaces of the positive electrode current collector.

The positive electrode active material may be, for example, a lithium-containing composite oxide. Examples thereof include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMPO_4$, $Li_2MPO_4F$, where M is at least one selected from the group consisting of Na, Mg, Sc, Y, Mn, Fe, Co, Ni, Cu, Zn, Al, Cr, Pb, Sb, and B. Here, a=0 to 1.2, b=0 to 0.9, and c=2.0 to 2.3. The value "a" representing the molar ratio of lithium is subjected to increase and decrease during charge and discharge.

Preferred is a lithium-nickel composite oxide represented by $Li_aNi_bM_{1-b}O_2$, where M is at least one selected from the group consisting of Mn, Co, and Al, 0<a≤1.2, and 0.3≤b≤1. In view of achieving a higher capacity, b preferably satisfies $0.85 \leq b \leq 1$. In view of the stability of the crystal structure, more preferred is $Li_aNi_bCo_cAl_dO_2$ containing Co and Al as elements represented by M, where $0 < a \leq 1.2$, $0.85 \leq b < 1$, $0 < c < 0.15$, $0 < d \leq 0.1$, and $b+c+d=1$.

The positive electrode material mixture layer may include a binder, an electrically conductive agent, and the like. The binder and the conductive agent may be similar to those exemplified for the negative electrode. The conductive agent may be graphite, such as natural graphite and artificial graphite.

The form and the thickness of the positive electrode current collector may be respectively selected from the forms and the ranges corresponding to those of the negative electrode current collector. The positive electrode current collector may be made of, for example, stainless steel, aluminum, an aluminum alloy, and titanium.

[Electrolyte]

The electrolyte is a non-aqueous electrolyte and contains a non-aqueous solvent and a lithium salt dissolved in the non-aqueous solvent. The concentration of the lithium salt in the electrolyte is preferably, for example, 0.5 mol/L or more and 2 mol/L or less. By controlling the lithium salt concentration within the range above, an electrolyte having excellent ion conductivity and a moderate viscosity can be obtained. The lithium salt concentration, however, is not limited to the above.

Examples of the non-aqueous solvent include cyclic carbonic acid esters (except below-described unsaturated cyclic carbonic acid ester), chain carbonic acid esters, cyclic carboxylic acid esters, and chain carboxylic acid esters. The cyclic carbonic acid esters are exemplified by propylene carbonate (PC) and ethylene carbonate (EC). The chain carbonic acid esters are exemplified by diethyl carbonate (DEC), ethyl methyl carbonate (EMC), and dimethyl carbonate (DMC). The cyclic carboxylic acid esters are exemplified by γ-butyrolactone (GBL) and γ-valerolactone (GVL). The chain carboxylic acid esters are exemplified by methyl formate, ethyl formate, propyl formate, methyl acetate, ethyl acetate, propyl acetate, methyl propionate, ethyl propionate, and propyl propionate. These non-aqueous solvents may be used singly or in combination of two or more kinds.

Examples of the lithium salt include: $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, borates, and imides. Examples of the borates include lithium bis(1,2-benzenediolate(2-)-O,O') borate, lithium bis(2,3-naphthalenediolate(2-)-O,O') borate, lithium bis(2,2'-biphenyldiolate(2-)-O,O') borate, lithium bis(5-fluoro-2-olate-1-benzenesulfonate-O,O') borate. Examples of the imides include lithium bisfluorosulfonyl imide (LiN$(FSO_2)_2$: hereinafter sometimes referred to as LFSI), lithium bistrifluoromethanesulfonyl imide (LiN$(CF_3SO_2)_2$), lithium trifluoromethanesulfonyl nonafluorobutanesulfonyl imide (LiN$(CF_3SO_2)(C_4F_9SO_2)$), and lithium bispentafluoroethanesulfonyl imide (LiN$(C_2F_5SO_2)_2$). Preferred among them is at least one of $LiPF_6$ and LFSI. These lithium salts may be used singly or in combination of two or more kinds.

The electrolyte may contain an additive. Examples of the additive include succinic anhydride, maleic anhydride, ethylene sulfite, fluorobenzene, hexafluorobenzene, cyclohexylbenzene (CHB), 4-fluoroethylene carbonate (FEC), lithium bis(oxalato) borate (LiBOB), lithium difluoro(oxalato) borate (LiFOB), adiponitrile, and pimelonitrile. A cyclic carbonic acid ester having in its molecule at least one carbon-carbon unsaturated bond (hereinafter, an unsaturated cyclic carbonic acid ester) may be contained.

Examples of the unsaturated cyclic carbonic acid ester include vinylene carbonate, 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinyl ethylene carbonate, and divinyl ethylene carbonate. These unsaturated cyclic carbonic acid esters may be used singly or in combination of two or more kinds. In the unsaturated cyclic carbonate ester, one or more hydrogen atoms may be substituted by fluorine atom.

[Separator]

Usually, it is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

In an exemplary structure of the non-aqueous electrolyte secondary battery, an electrode group formed by winding the positive electrode and the negative electrode with the separator interposed therebetween is housed together with the electrolyte in an outer case. The wound-type electrode group may be replaced with a different form of the electrode group, such as a stacked-type electrode group formed by stacking the positive electrode and the negative electrode with the separator interposed therebetween. The secondary battery may be in any form, such as cylindrical type, prismatic type, coin type, button type, or laminate type.

A description will be given below of the structure of a prismatic non-aqueous electrolyte secondary battery, as an example of a non-aqueous electrolyte secondary battery according to the present invention, with reference to FIG. 1. FIG. 1 is a partially cut-away schematic oblique view of a non-aqueous electrolyte secondary battery according to an embodiment of the present disclosure.

The battery includes a bottomed prismatic battery case 4, and an electrode group 1 and an electrolyte (not shown) housed in the battery case 4. The electrode group 1 has a continuous belt-like negative electrode, a continuous belt-like positive electrode, and a separator interposed therebetween and preventing them from directly contacting with each other. The electrode group 1 is formed by winding the negative electrode, the positive electrode, and the separator around a flat plate-like winding core, and then removing the winding core. The capacities of the positive electrode and the negative electrode are designed such that the open circuit potential of the negative electrode in a fully charged condition becomes 0 V or higher and 70 mV or lower relative to lithium metal.

A negative electrode lead 3 is attached at its one end to the negative electrode current collector of the negative electrode, by means of welding or the like. The other end of the negative electrode lead 3 is electrically connected, via an electrically insulating plate made of resin (not shown), to a negative electrode terminal 6 disposed at a sealing plate 5. The negative electrode terminal 6 is insulated from the sealing plate 5 by a gasket 7 made of resin. A positive electrode lead 2 is attached at its one end to the positive electrode current collector of the positive electrode, by means of welding or the like. The other end of the positive electrode lead 2 is electrically connected, via the insulating plate, to the back side of the sealing plate 5. In other words, the positive electrode lead 2 is electrically connected to the battery case 4 which also serves as a positive electrode terminal. The insulating plate separates the electrode group 1 from the sealing plate 5, and separates the negative electrode lead 3 from the battery case 4. The sealing plate 5 is fitted at its periphery to the opening end of the battery case 4, and the fitted portion is laser-welded. The opening of the battery case 4 is sealed with the sealing plate 5. The electrolyte injection hole provided in the sealing plate 5 is closed with a sealing stopper 8.

Figure 2:
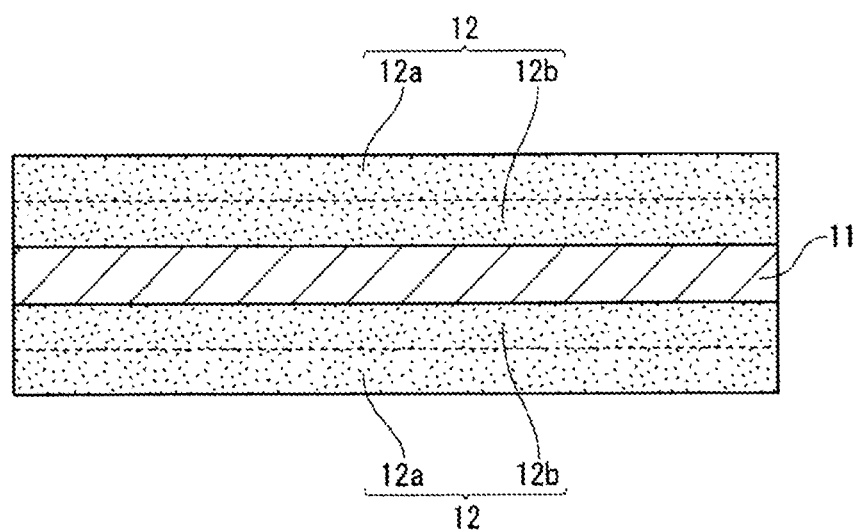
FIG. 2 A schematic cross-sectional view of a negative electrode used in the non-aqueous electrolyte secondary battery of FIG. 1.

FIG. 2 is a schematic cross-sectional view of a negative electrode used in the non-aqueous electrolyte secondary battery of FIG. 1.

The negative electrode has a negative electrode current collector 11 and a negative electrode material mixture layer 12 formed on both surfaces of the negative electrode current collector 11. The negative electrode material mixture layer 12 has a first region 12a on the negative electrode surface side and a second region 12b on the negative electrode current collector 11 side, each region having a thickness $T_0/2$, which is ½ of the thickness $T_0$ of the electrode material mixture layer 12. A ratio: $M_{S1}/M_{S2}$ of a mass ratio $M_{S1}$ of the silicon-containing material in the first region 12a to a mass ratio $M_{S2}$ of the silicon-containing material in the second region 12b is not less than 0 and less than 1. The thickness $T_1$ of the first region 12a is $T_0/2$ in FIG. 2, but not limited thereto, and may be in the range of $(1/20)T_0$ or more to $(19/20)T_0$ or less.

The present invention will be specifically described below with reference to Examples and Comparative Examples. It is to be noted, however, the present invention is not limited to the following Examples.

Examples 1 to 4

[Preparation of LSX Material]

Silicon dioxide and lithium carbonate were mixed so as to contain Si and Li in an atomic ratio: Si/Li of 1.05. The mixture was baked in the air at 950° C. for 10 hours, to obtain a lithium silicate represented by $Li_2Si_2O_5$ (z=½). The obtained lithium silicate was pulverized to have an average particle diameter of 10 μm.

The lithium silicate ($Li_2Si_2O_5$) having an average particle diameter of 10 μm was mixed with a raw material silicon (3N, average particle diameter: 10 μm) in a mass ratio of 45:55. The mixture was placed in a pot (made of SUS, volume: 500 mL) of a planetary ball mill (P-5, available from Fritsch Co., Ltd.), together with 24 SUS balls (diameter: 20 mm). In the pot with the lid closed, the mixture was pulverized at 200 rpm for 50 hours in an inert atmosphere.

Next, the powdered mixture was taken out in an inert atmosphere, which was then heated at 800° C. for four hours, in an inert atmosphere, with a predetermined pressure applied thereto by a hot press, to give a sintered body of the mixture (an LSX material).

Thereafter, the LSX material was pulverized and passed through a 40-μm mesh, and then, the obtained LSX particles were mixed with a coal pitch (MCP 250, available from JFE Chemical Corporation). The mixture was baked at 800° C. in an inert atmosphere, so that a conductive layer containing an electrically conductive carbon was formed on the surfaces of the LSX particles. The coating amount of the conductive layer relative to the total mass of the LSX particles and the conductive layer was set to 5 mass %. Thereafter, a sieve was used to obtain LSX particles having the conductive layer and an average particle diameter of 10 μm.

The crystallite size of the silicon particles calculated using the Scherrer formula from a diffraction peak attributed to the Si (111) plane obtained by XRD analysis of the LSX particles was 15 nm.

The composition of the lithium silicate phase analyzed by the method above was $Li_2Si_2O_5$. The silicon particle content in the LSX particles measured by Si-NMR was 55 mass % (the content of $Li_2Si_2O_5$ was 45 mass %).

[Production of Negative Electrode]

A first slurry for forming a first region and a second slurry for forming a second region were prepared.

(Preparation of First Slurry)

Water was added to a first negative electrode material mixture, and then stirred together using a mixer, to prepare a first slurry. For the first negative electrode material mixture, a negative electrode active material and a negative electrode auxiliary material were used at a mass ratio of 98.6:1.4. For the negative electrode active material, only graphite was used. Specifically, the mass ratio $M_{S1}$ of the LSX in the first negative electrode material mixture (first region) was set to 0 mass %, the mass ratio $M_{C1}$ of the graphite in the first negative electrode material mixture (first region) was set to 98.6 mass %, and the mass ratio $M_{A1}$ of the negative electrode auxiliary material in the first negative electrode material mixture (first region) was set to 1.4 mass %. For the negative electrode auxiliary material, sodium carboxymethyl cellulose (CMC-Na), polyvinylidene fluoride (PVDF), and styrene-butadiene rubber (SBR) were used at a mass ratio of 0.9:0.1:1.5.

(Preparation of Second Slurry)

Water was added to a second negative electrode material mixture, and then stirred together using a mixer, to prepare a second slurry.

For the second negative electrode material mixture, a negative electrode active material and a negative electrode auxiliary material were used at a mass ratio of 97.1:2.9. For the negative electrode active material, LSX and graphite were used at a mass ratio of 6:94. Specifically, the mass ratio $M_{S2}$ of the LSX in the second negative electrode material mixture (second region) was set to 5.8 mass %, the mass ratio $M_{C2}$ of the graphite in the second negative electrode material mixture (second region) was set to 91.3 mass %, and the mass ratio $M_{A2}$ of the negative electrode auxiliary material in the second negative electrode material mixture (second region) was set to 2.9 mass %. The negative electrode auxiliary material used here was the same as that used for the first slurry.

The second slurry and the first slurry were applied in this order onto a surface of a copper foil serving as a negative electrode current collector. The applied film of the first and second negative electrode slurries was dried, and then rolled, to form a negative electrode material mixture layer (thickness $T_0$: 210 μm, density: 1.5 g/cm³) on both surfaces of the copper foil. A negative electrode was thus obtained. The negative electrode material mixture layer had a first region formed of the first slurry and a second region formed of the second slurry, in this order from the surface side.

In the production of negative electrode, the amounts of the first and second slurries applied were adjusted such that the ratio: $T_1/T_0$ of the thickness $T_1$ of the first region to the thickness $T_0$ of the negative electrode material mixture layer, and the ratio: $T_2/T_0$ of the thickness $T_2$ of the second region to the thickness $T_0$ of the negative electrode material mixture layer became as shown in Table 1. The thickness $T_0$ of the negative electrode material mixture layer (total of $T_1$ and $T_2$) of the negative electrode material mixture layer was fixed.

[Production of Positive Electrode]

A lithium-nickel composite oxide ($LiNi_{0.8}Co_{0.18}Al_{0.02}O_2$) was mixed with acetylene black and polyvinylidene fluoride in a mass ratio of 95:2.5:2.5, to which N-methyl-2-pyrrolidone (NMP) was added, and then stirred together using a mixer, to prepare a positive electrode slurry. Next, the positive electrode slurry was applied onto a surface of an aluminum foil. The applied film was dried, and then rolled, to give a positive electrode with a positive electrode material mixture layer having a density of 3.6 g/cm³ formed on both surfaces of the aluminum foil.

[Preparation of Electrolyte]

A lithium salt was dissolved in a non-aqueous solvent, to prepare an electrolyte. The non-aqueous solvent used here was a mixed solvent containing ethylene carbonate (EC) and dimethyl carbonate (DMC) in a volume ratio of 30:70. The lithium salt used here was $LiPF_6$. The concentration of $LiPF_6$ in the electrolyte was set to 1.1 mol/L.

[Fabrication of Non-Aqueous Electrolyte Secondary Battery]

The positive electrode and the negative electrode, with a tab attached to each electrode, were wound spirally with a separator interposed therebetween such that the tab was positioned at the outermost layer, thereby to form an electrode group. The electrode group was inserted into an outer case made of aluminum laminated film and dried under vacuum at 105° C. for 2 h. The electrolyte was injected into the case, and the opening of the outer case was sealed. Batteries A1 to A4 of Examples 1 to 4 were thus obtained. The $C_n/C_p$ ratio was designed in the range of 0.8 to 0.9, so that the open circuit potential of the negative electrode in a fully charged condition became 60 mV relative to lithium metal.

Example 5

In the preparation of first slurry, LSX and graphite were used for the negative electrode active material. The mass ratio $M_{S2}$ of the LSX in the first negative electrode material mixture (first region) was set to 1 mass %, and the mass ratio $M_{C2}$ of the graphite in the first negative electrode material mixture (first region) was set to 97.6 mass %. A battery A5 was prepared in the same manner as in Example 1, except the above.

Comparative Example 1

In the production of negative electrode, the second slurry was applied onto a surface of a copper foil serving as a negative electrode current collector, dried, and then rolled, to form a negative electrode material mixture layer (thickness $T_0$: 180 µm, density: 1.5 g/cm$^3$) on both surfaces of the copper foil. A battery B1 was fabricated in the same manner as in Example 1, except that the negative electrode material mixture layer was formed using the second slurry only.

Comparative Example 2

In the production of negative electrode, the first slurry was applied onto a surface of a copper foil serving as a negative electrode current collector, dried, and then rolled, to form a negative electrode material mixture layer (thickness $T_0$: 220 µm, density: 1.5 g/cm$^3$) on both surfaces of the copper foil. A battery B2 was fabricated in the same manner as in Example 1, except that the negative electrode material mixture layer was formed using the first slurry only.

Comparative Example 3

A battery B3 was fabricated in the same manner as in Comparative Example 1, except that the $C_n/C_p$ ratio was set to 1.05, so that the open circuit potential of the negative electrode in a fully charged condition became 80 mV relative to lithium metal.

Each of the batteries fabricated above was evaluated for the following properties.

[Evaluation 1: Cell Capacity]

Each of the batteries after fabrication was, in a 25° C. environment, constant-current charged at a current of 0.3 It until the voltage reached 4.2 V, and then constant-voltage charged at a voltage of 4.2 V until the current reached 0.015 It. This was followed by a constant-current discharge at 0.3 It until the voltage reached 2.75 V. The rest time between charge and discharge was 10 min. The charge and discharge were performed in a 25° C. environment. A discharge capacity at this time (initial capacity) was measured as a cell capacity. Table 1 shows relative values (index) of each Example and each Comparative Example, with the result of Example 1 taken as 100.

Here, (1/X) It represents a current, and (1/X) It (A)=Rated capacity (Ah)/X (h), where X represents the time consumed for charging or discharging the electricity equivalent to the rated capacity. For example, 0.5 It represents a case where X=2, meaning that the current value is the rated capacity (Ah)/2 (h).

[Evaluation 2: Cycle Capacity Retention Ratio]

Charge and discharge was repeated under the same conditions as in Evaluation 1. The ratio (percentage) of a discharge capacity at the 300th cycle to a discharge capacity at the 1st cycle was calculated as a cycle capacity retention ratio. Table 1 shows relative values (index) of each Example and each Comparative Example, with the result of Example 1 taken as 100.

TABLE 1

| | First region (first slurry) | | | | Second region (Second slurry) | | | | | | Evaluation | | |
|---|---|---|---|---|---|---|---|---|---|---|---|---|---|
| Battery No. | Mass ratio of LSX $M_{S1}$ (wt %) | Mass ratio of graphite $M_{C1}$ (wt %) | Mass ratio of negative electrode auxiliary material $M_{A1}$ (wt %) | Thickness ratio to negative electrode material mixture layer $T_1/T_0$ | Mass ratio of LSX $M_{S2}$ (wt %) | Mass ratio of graphite $M_{C2}$ (wt %) | Mass ratio of negative electrode auxiliary material $M_{A2}$ (wt %) | Thickness ratio to negative electrode material mixture layer $T_2/T_0$ | $M_{S1}/M_{S2}$ | $M_{A1}/M_{A2}$ | Open circuit voltage (mV) | Cell Capacity (index) | Cycle capacity retention ratio (index) |
| B3 | — | — | — | 0 | 5.8 | 91.3 | 2.9 | 1 | — | — | 80 | 90 | 105 |
| B1 | — | — | — | 0 | 5.8 | 91.3 | 2.9 | 1 | — | — | 60 | 100 | 90 |
| A1 | 0 | 98.6 | 1.4 | 1/10 | 5.8 | 91.3 | 2.9 | 9/10 | 0/5.8 | 1.4/2.9 | 60 | 100 | 100 |
| A5 | 1 | 97.6 | 1.4 | 1/10 | 5.8 | 91.3 | 2.9 | 9/10 | 1/5.8 | 1.4/2.9 | 60 | 102 | 100 |
| A2 | 0 | 98.6 | 1.4 | 1/5 | 5.8 | 91.3 | 2.9 | 4/5 | 0/5.8 | 1.4/2.9 | 60 | 100 | 100 |
| A3 | 0 | 98.6 | 1.4 | 1/2 | 5.8 | 91.3 | 2.9 | 1/2 | 0/5.8 | 1.4/2.9 | 60 | 100 | 100 |
| A4 | 0 | 98.6 | 1.4 | 9/10 | 5.8 | 91.3 | 2.9 | 1/10 | 0/5.8 | 1.4/2.9 | 60 | 100 | 100 |
| B2 | 0 | 98.6 | 1.4 | 1 | — | — | — | 0 | — | — | 60 | 80 | 95 |

The batteries A1 to A5 exhibited a high cell capacity and excellent cycle characteristics. In the battery A1 to A4, $M_{S1}/M_{S2}$ was 0, and $M_{A1}/M_{A2}$ was about 0.48, and $M_{C1}/M_{C2}$ was about 1.08. $T_1/T_0$ was not less than 9/10 and not greater than 1/10. In the battery A5, $M_{S1}/M_{S2}$ was about 0.17, and $M_{A1}/M_{A2}$ was about 0.48, and $M_{C1}/M_{C2}$ was about 1.07, and $T_1/T_0$ was 1/10.

In the battery B1, the amount of LSX was large on the negative electrode surface side of the negative electrode material mixture layer, which facilitated the deterioration of the LSX due to the side reaction with the Li metal deposited on the negative electrode surface, and resulted in low cycle characteristics. In the battery B2, the negative electrode mixture layer contained no LSX, which resulted in a low cell capacity. In the battery B3 in which the open circuit potential of the negative electrode in a fully charged condition was greater than 70 mV relative to lithium metal, the deterioration of the LSX did not proceed on the negative electrode surface since no lithium metal deposited on the negative electrode surface in a fully charged condition, which resulted in higher cycle characteristics than in the battery B1, but the utilization rate of the negative electrode decreased, resulting in a low cell capacity.

Examples 6 to 8 and Comparative Examples 4 to 6

Batteries A6 to A8 of Examples 6 to 8 and comparative batteries B5 and B6 of Comparative Examples 5 and 6 were fabricated and evaluated in the same manner as in Example 1, except that the $C_n/CP$ ratio was adjusted, so that the open circuit potential of the negative electrode in a fully charged condition became as shown in Table 2 relative to lithium metal. In Examples 6 to 8 (batteries A6 to A8), the $C_n/C_p$ ratio was adjusted in the range of about 0.5 to 0.9. In Comparative Example 5 (battery B5), the $C_n/C_p$ ratio was set to 1.05. In Comparative Example 6 (battery B6), the $C_n/C_p$ ratio was set to 1.1.

A battery B4 of Comparative Example 4 in which the open circuit potential of the negative electrode in a fully charged condition was 0 mV relative to lithium metal was fabricated and evaluated in the same manner as in Example 1, except that for the negative electrode, only a copper foil (negative electrode current collector) was used, without forming a negative electrode material mixture layer (i.e., the $C_n/C_p$ ratio was set to 0).

The evaluation results of the batteries A1 and A6 to A8 and the batteries B4 to B6 are shown in Table 2.

dition was higher than 70 mV, no lithium metal deposited on the surface of the negative electrode in a fully charged condition, and the utilization rate of the negative electrode decreased, which resulted in a low cell capacity.

INDUSTRIAL APPLICABILITY

The non-aqueous electrolyte secondary battery according to the present invention is useful as a main power source for mobile communication equipment, portable electronic equipment, and other devices.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: electrode group, 2: positive electrode lead, 3: negative electrode lead, 4: battery case, 5: sealing plate, 6: negative electrode terminal, 7: gasket, 8: sealing stopper, 11: negative electrode current collector, 12: negative electrode material mixture layer, 12a: first region, 12b: second region

The invention claimed is:
1. A non-aqueous electrolyte secondary battery, comprising:
a positive electrode; a negative electrode; and an electrolyte,
the negative electrode including a negative electrode material mixture layer containing a negative electrode

TABLE 2

| | First region (first slurry) | | | | Second region (Second slurry) | | | | | | Evaluation | | |
|---|---|---|---|---|---|---|---|---|---|---|---|---|---|
| Battery No. | Mass ratio of LSX $M_{S1}$ (wt %) | Mass ratio of graphite $M_{C1}$ (wt %) | Mass ratio of negative electrode auxiliary material $M_{A1}$ (wt %) | Thickness ratio to negative electrode material mixture layer $T_1/T_0$ | Mass ratio of LSX $M_{S2}$ (wt %) | Mass ratio of graphite $M_{C2}$ (wt %) | Mass ratio of negative electrode auxiliary material $M_{A2}$ (wt %) | Thickness ratio to negative electrode material mixture layer $T_2/T_0$ | $M_{S1}/M_{S2}$ | $M_{A1}/M_{A2}$ | Open circuit voltage (mV) | Cell Capacity (index) | Cycle capacity retention ratio (index) |
| B4 | — | — | — | — | — | — | — | — | — | — | 0 | 100 | 50 |
| A6 | 0 | 98.6 | 1.4 | 1/10 | 5.8 | 91.3 | 2.9 | 9/10 | 0/5.8 | 1.4/2.9 | 40 | 110 | 100 |
| A7 | 0 | 98.6 | 1.4 | 1/10 | 5.8 | 91.3 | 2.9 | 9/10 | 0/5.8 | 1.4/2.9 | 50 | 105 | 100 |
| A1 | 0 | 98.6 | 1.4 | 1/10 | 5.8 | 91.3 | 2.9 | 9/10 | 0/5.8 | 1.4/2.9 | 60 | 100 | 100 |
| A8 | 0 | 98.6 | 1.4 | 1/10 | 5.8 | 91.3 | 2.9 | 9/10 | 0/5.8 | 1.4/2.9 | 70 | 100 | 100 |
| B5 | 0 | 98.6 | 1.4 | 1/10 | 5.8 | 91.3 | 2.9 | 9/10 | 0/5.8 | 1.4/2.9 | 80 | 90 | 98 |
| B6 | 0 | 98.6 | 1.4 | 1/10 | 5.8 | 91.3 | 2.9 | 9/10 | 0/5.8 | 1.4/2.9 | 90 | 80 | 99 |

In the batteries A1 and A6 to A8 in which the open circuit potential of the negative electrode in a fully charged condition was higher than 0 mV and 70 mV or lower, a high cell capacity and excellent cycle characteristics were obtained. In the battery B4 in which the open circuit potential of the negative electrode in a fully charged condition was 0 mV, due to the growth of lithium metal dendrites on the surface of the copper foil, the cycle characteristics were significantly lowered. The battery B5 and B6 in which the open circuit potential of the negative electrode in a fully charged conactive material, and a negative electrode current collector supporting the negative electrode material mixture layer, wherein
the negative electrode active material includes a carbon material and a silicon-containing material,
the silicon-containing material includes a lithium ion conductive phase, and silicon particles dispersed in the lithium ion conductive phase,
the lithium ion conductive phase is a silicate phase and/or a carbon phase, the silicate phase contains at least one selected from the group consisting of alkali metal elements and Group 2 elements, the negative electrode material mixture layer has a thickness $T_0$, and includes a first region on the negative electrode surface side having a thickness of $T_1$, and a second region other than the first region on the negative electrode current collector side, a ratio: $T_1/T_0$ of the thickness $T_1$ of the first region to the thickness $T_0$ of the negative electrode material mixture layer is not less than 1/20 and not greater than 19/20, a ratio: $M_{s1}/M_{s2}$ of a mass ratio $M_{s1}$ of the silicon-containing material in the first region to a mass ratio $M_{s2}$ of the silicon-containing material in the second region is not less than 0 and less than 1, and an open circuit potential of the negative electrode in a fully charged condition is higher than 0 mV and 70 mV or lower relative to lithium metal.

2. The non-aqueous electrolyte secondary battery according to claim 1, wherein the $M_{s1}/M_{s2}$ is not less than 0 and not greater than 1/3.

3. The non-aqueous electrolyte secondary battery according to claim 1, wherein the first region contains the carbon material and does not contain the silicon-containing material.

4. The non-aqueous electrolyte secondary battery according to claim 1, wherein the $T_1/T_0$ is not less than 1/20 and not greater than 6/20.

5. The non-aqueous electrolyte secondary battery according to claim 1, wherein the negative electrode material mixture layer further contains a negative electrode auxiliary material, and a ratio: $M_{A1}/M_{A2}$ of a mass ratio $M_{A1}$ of the negative electrode auxiliary material in the first region to a mass ratio $M_{A2}$ of the negative electrode auxiliary material in the second region is less than 1.

6. The non-aqueous electrolyte secondary battery according to claim 5, wherein the $M_{A1}/M_{A2}$ is not less than 1/3 and less than 1.

7. The non-aqueous electrolyte secondary battery according to claim 5, wherein the mass ratio $M_{A1}$ of the negative electrode auxiliary material in the first region is 1.0 mass % or more and 1.4 mass % or less, and the mass ratio $M_{A2}$ of the negative electrode auxiliary material in the second region is 2.6 mass % or more and 3.0 mass % or less.

8. The non-aqueous electrolyte secondary battery according to claim 1, wherein in the second region, a mass ratio of the silicon-containing material to the carbon material is not less than 1/99 and not greater than 10/90.

9. The non-aqueous electrolyte secondary battery according to claim 1, wherein the open circuit potential of the negative electrode in a fully charged condition is 40 mV or higher and 60 mV or lower relative to lithium metal.

10. The non-aqueous electrolyte secondary battery according to claim 1, wherein a ratio: Cn/Cp of a capacity Cn of the of the negative electrode to a capacity Cp of the positive electrode is greater than 0 and less than 1.

* * * * *